(12) United States Patent
Miranda et al.

(10) Patent No.: US 10,961,864 B2
(45) Date of Patent: Mar. 30, 2021

(54) PASSIVE FLOW MODULATION OF COOLING FLOW INTO A CAVITY

(71) Applicant: General Electric Company, Schenectady, NY (US)

(72) Inventors: Carlos Miguel Miranda, Greer, SC (US); Stanley Kevin Widener, Greer, SC (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 16/046,017

(22) Filed: Jul. 26, 2018

(65) Prior Publication Data

US 2018/0355750 A1 Dec. 13, 2018

Related U.S. Application Data

(63) Continuation of application No. 14/983,779, filed on Dec. 30, 2015, now abandoned.

(51) Int. Cl.
*F02C 7/18* (2006.01)
*F01D 17/14* (2006.01)
(Continued)

(52) U.S. Cl.
CPC ............. *F01D 17/145* (2013.01); *F01D 5/02* (2013.01); *F01D 9/00* (2013.01); *F01D 17/085* (2013.01);
(Continued)

(58) Field of Classification Search
None
See application file for complete search history.

(56) References Cited

U.S. PATENT DOCUMENTS 799,256 A 9/1905 Parker
2,659,198 A 11/1953 Cook
(Continued)

FOREIGN PATENT DOCUMENTS

EP 0391288 B1 5/1994
EP 1189805 A1 3/2002
(Continued)

OTHER PUBLICATIONS

U.S. Appl. No. 15/417,579 Notice of Allowance dated Apr. 8, 2020, (GEEN-0901-US), 11 pages.
(Continued)

*Primary Examiner* — Kayla Mccaffrey
(74) *Attorney, Agent, or Firm* — James Pemrick; Hoffman Warnick LLC

(57) ABSTRACT

A passive flow modulation device according to an embodiment includes: a pressure sensitive main valve controlling a flow of a cooling fluid from a first area to a second area through an orifice; and a temperature sensitive pilot valve coupled to the pressure sensitive main valve, the temperature sensitive pilot valve configured to open at a predetermined temperature in the first area, causing a pressurization of the pressure sensitive main valve, wherein the pressurization of the pressure sensitive main valve actuates the pressure sensitive main valve to an open position, allowing the cooling fluid to flow from the first area to the second area through the orifice.

16 Claims, 8 Drawing Sheets

(51) Int. Cl.
  *F16K 31/00* (2006.01)
  *G05D 23/02* (2006.01)
  *F01D 5/02* (2006.01)
  *F01D 9/00* (2006.01)
  *F01D 17/08* (2006.01)
  *F01D 25/12* (2006.01)

(52) U.S. Cl.
  CPC ........... *F01D 17/141* (2013.01); *F01D 25/12* (2013.01); *F16K 31/002* (2013.01); *G05D 23/02* (2013.01); *G05D 23/022* (2013.01); *F05D 2220/30* (2013.01); *F05D 2260/2212* (2013.01); *F05D 2300/5021* (2013.01); *Y02T 50/60* (2013.01)

(56) References Cited

U.S. PATENT DOCUMENTS

| | | | |
|---|---|---|---|
| 2,787,440 A | 4/1957 | Thompson, Jr. | |
| 2,880,579 A | 4/1959 | Harshman | |
| 3,004,494 A | 10/1961 | Corbett | |
| 3,733,816 A | 5/1973 | Grennan et al. | |
| 3,851,998 A | 12/1974 | Downing | |
| 4,159,623 A | 7/1979 | McReynolds | |
| 4,255,927 A | 3/1981 | Johnson et al. | |
| 4,807,433 A * | 2/1989 | Maclin | F02C 7/18 60/795 |
| 5,022,817 A | 6/1991 | O'Halloran | |
| 5,051,065 A | 9/1991 | Ansen | |
| 5,235,812 A | 8/1993 | Klaass et al. | |
| 5,279,109 A | 1/1994 | Liu et al. | |
| 5,349,812 A | 9/1994 | Taniguchi et al. | |
| 5,548,951 A | 8/1996 | Mumford et al. | |
| 5,557,920 A | 9/1996 | Kain | |
| 5,716,423 A | 2/1998 | Krul et al. | |
| 5,737,922 A | 4/1998 | Schoenman et al. | |
| 5,820,589 A | 10/1998 | Torgerson et al. | |
| 5,906,238 A | 5/1999 | Carmody et al. | |
| 5,924,276 A | 7/1999 | Mowill | |
| 5,988,589 A | 11/1999 | Mowill | |
| 6,016,824 A | 1/2000 | Watanabe | |
| 6,021,979 A | 2/2000 | Bender et al. | |
| 6,022,197 A | 2/2000 | Cygnor et al. | |
| 6,050,079 A | 4/2000 | Durgin et al. | |
| 6,226,977 B1 | 5/2001 | Ichiryu et al. | |
| 6,237,323 B1 | 5/2001 | Ojiro et al. | |
| 6,250,066 B1 | 6/2001 | Lawrence et al. | |
| 6,327,845 B2 | 12/2001 | Ojiro et al. | |
| 6,390,733 B1 | 5/2002 | Burbage et al. | |
| 6,416,279 B1 | 7/2002 | Weigand et al. | |
| 6,449,956 B1 | 9/2002 | Kolman et al. | |
| 6,471,675 B1 | 10/2002 | Rogers | |
| 6,568,188 B2 | 5/2003 | Kolman et al. | |
| 6,589,205 B1 | 7/2003 | Meadows | |
| 6,595,098 B1 | 7/2003 | Wray | |
| 6,622,475 B2 | 9/2003 | Brault et al. | |
| 6,860,098 B2 | 3/2005 | Suenaga et al. | |
| 6,892,543 B2 | 5/2005 | Nakae | |
| 6,931,859 B2 | 8/2005 | Morgan et al. | |
| 6,979,315 B2 | 12/2005 | Rogers et al. | |
| 7,000,396 B1 | 2/2006 | Storey | |
| 7,200,986 B2 | 4/2007 | Sanders | |
| 7,299,618 B2 | 11/2007 | Terazaki et al. | |
| 7,340,880 B2 | 3/2008 | Magoshi et al. | |
| 7,631,504 B2 | 12/2009 | Belsom | |
| 7,698,894 B2 | 4/2010 | Wood et al. | |
| 7,744,060 B2 | 6/2010 | Sneh | |
| 7,823,389 B2 | 11/2010 | Seitzer et al. | |
| 7,876,224 B2 | 1/2011 | Prokopuk | |
| 8,083,205 B2 | 12/2011 | Sneh | |
| 8,171,998 B1 | 5/2012 | Darnell et al. | |
| 8,267,863 B2 | 9/2012 | Najafi et al. | |
| 8,275,533 B2 | 9/2012 | Davis, Jr. et al. | |
| 8,281,601 B2 | 10/2012 | McMahan et al. | |
| 8,307,662 B2 | 11/2012 | Turco | |
| 8,322,346 B2 | 12/2012 | Najafi et al. | |
| 8,549,864 B2 | 10/2013 | Langdon, II et al. | |
| 8,596,035 B2 | 12/2013 | Mowill | |
| 8,684,660 B2 * | 4/2014 | Miranda | F02C 7/141 415/17 |
| 8,966,877 B2 | 3/2015 | McKinney | |
| 9,028,206 B2 | 5/2015 | Liotta et al. | |
| 9,052,115 B2 | 6/2015 | Stoia et al. | |
| 9,097,084 B2 | 8/2015 | McDougall et al. | |
| 9,243,802 B2 | 1/2016 | Hawie et al. | |
| 2002/0087120 A1 | 7/2002 | Rogers et al. | |
| 2002/0148216 A1 | 10/2002 | Brault et al. | |
| 2005/0159789 A1 | 7/2005 | Brockway et al. | |
| 2005/0187509 A1 | 8/2005 | Wolf | |
| 2006/0016195 A1 | 1/2006 | Dalla Betta et al. | |
| 2006/0042256 A1 | 3/2006 | Storey | |
| 2007/0074516 A1 | 4/2007 | Peck et al. | |
| 2007/0137213 A1 | 6/2007 | Rickert et al. | |
| 2007/0187634 A1 | 8/2007 | Sneh | |
| 2007/0193274 A1 | 8/2007 | Belsom | |
| 2007/0241931 A1 | 10/2007 | Compton et al. | |
| 2007/0266705 A1 | 11/2007 | Wood et al. | |
| 2008/0095652 A1 | 4/2008 | Jiang | |
| 2008/0112798 A1 | 5/2008 | Seitzer et al. | |
| 2008/0269573 A1 | 10/2008 | Najafi et al. | |
| 2009/0005656 A1 | 1/2009 | Najafi | |
| 2009/0148273 A1 | 6/2009 | Suciu et al. | |
| 2009/0243855 A1 | 10/2009 | Prokopuk | |
| 2010/0236249 A1 | 9/2010 | McMahan et al. | |
| 2011/0088405 A1 | 4/2011 | Turco | |
| 2011/0162384 A1 | 7/2011 | Langdon, II et al. | |
| 2011/0173984 A1 | 7/2011 | Valeev et al. | |
| 2011/0265486 A1 | 11/2011 | Plant | |
| 2012/0039702 A1 | 2/2012 | Sharp | |
| 2013/0000315 A1 | 1/2013 | Mowill | |
| 2013/0046152 A1 | 2/2013 | Najafi et al. | |
| 2013/0145741 A1 | 6/2013 | Hawie et al. | |
| 2013/0152582 A1 | 6/2013 | Anschel et al. | |
| 2013/0154741 A1 | 6/2013 | Lee et al. | |
| 2013/0164157 A1 | 6/2013 | Roberts et al. | |
| 2013/0283807 A1 | 10/2013 | Stoia et al. | |
| 2013/0330168 A1 | 12/2013 | Liotta et al. | |
| 2014/0102544 A1 | 4/2014 | Riley et al. | |
| 2014/0216051 A1 | 8/2014 | Johnson et al. | |
| 2014/0127110 A1 | 9/2014 | Davis, III et al. | |
| 2015/0000939 A1 | 1/2015 | Willner | |
| 2015/0013345 A1 | 1/2015 | Porter et al. | |
| 2015/0377669 A1 | 12/2015 | DeSilva et al. | |

FOREIGN PATENT DOCUMENTS

| | | |
|---|---|---|
| EP | 1832751 A1 | 9/2007 |
| EP | 1770331 A3 | 9/2014 |
| GB | 2470253 A | 11/2010 |
| WO | 8602406 A1 | 4/1986 |
| WO | 9104395 A2 | 4/1991 |
| WO | 9727923 A1 | 8/1997 |
| WO | 2001002242 A1 | 1/2001 |
| WO | 2006060010 A1 | 6/2006 |
| WO | 2008127845 A1 | 10/2008 |
| WO | 2009006249 A1 | 1/2009 |
| WO | 2010072998 A1 | 7/2010 |
| WO | 2012030776 A2 | 3/2012 |
| WO | 2013001361 A2 | 1/2013 |
| WO | 2014099330 A1 | 6/2014 |
| WO | 2014178731 A2 | 11/2014 |
| WO | 2015176902 A1 | 11/2015 |

OTHER PUBLICATIONS

U.S. Appl. No. 15/417,579, Final Office Action dated Aug. 1, 2019, (GEEN-0901-US), 24 pgs.
U.S. Appl. No. 15/417,601, Office Action dated Aug. 7, 2019, (GEEN-0902-US), 25 pages.
U.S. Appl. No. 14/983,768, Notice of Allowance dated Sep. 24, 2018, (GEEN-0676-US), 17 pages.
U.S. Appl. No. 15/237,795, Office Action dated Nov. 26, 2018, (GEEN-0788-US), 34 pages.

(56) References Cited

OTHER PUBLICATIONS

U.S. Appl. No. 15/417,579, Office Action dated Mar. 8, 2019, (GEEN-0901-US), 22 pages.
U.S. Appl. No. 15/237,795, Notice of Allowance dated Apr. 11, 2019, (GEEN-0788-US), 12 pgs.
U.S. Appl. No. 14/983,774; Office Action dated Jul. 10, 2018; (GEEN-0742-US); 46 pages.
U.S. Appl. No. 14/983,768; Office Action dated Apr. 4, 2018; (GEEN-0676-US); 32 pages.
U.S. Appl. No. 14/983,779; Office Action dated Mar. 15, 2018; (GEEN-0743-US); 40 pages.

* cited by examiner

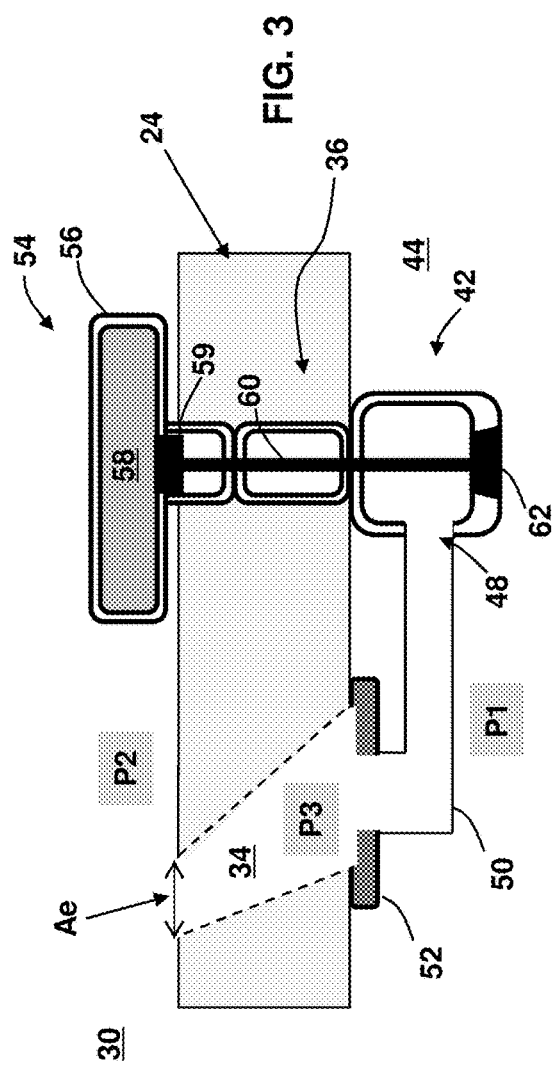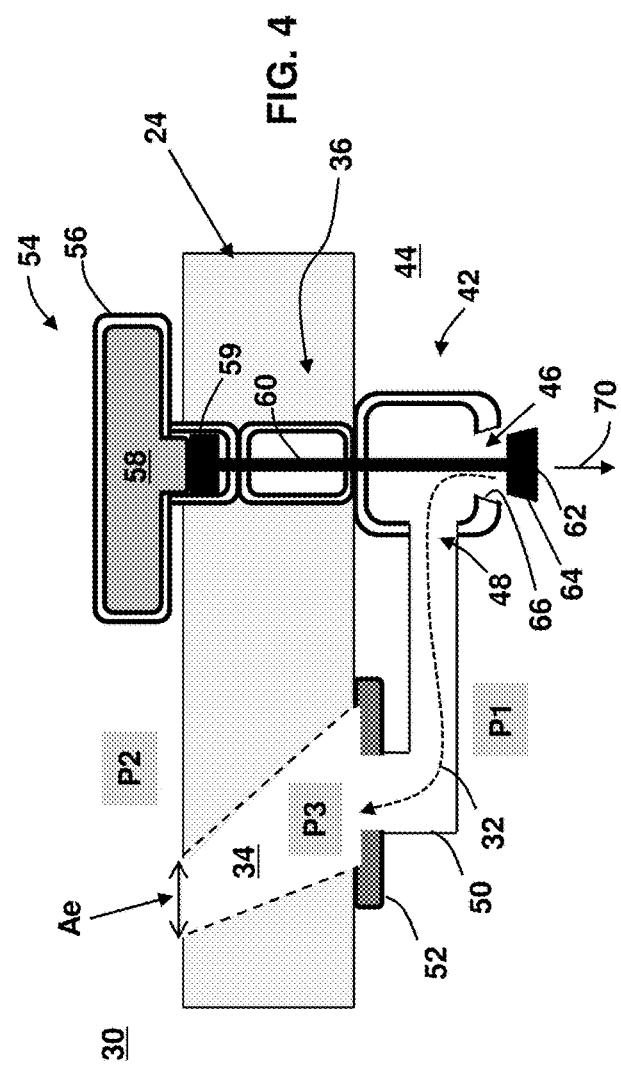

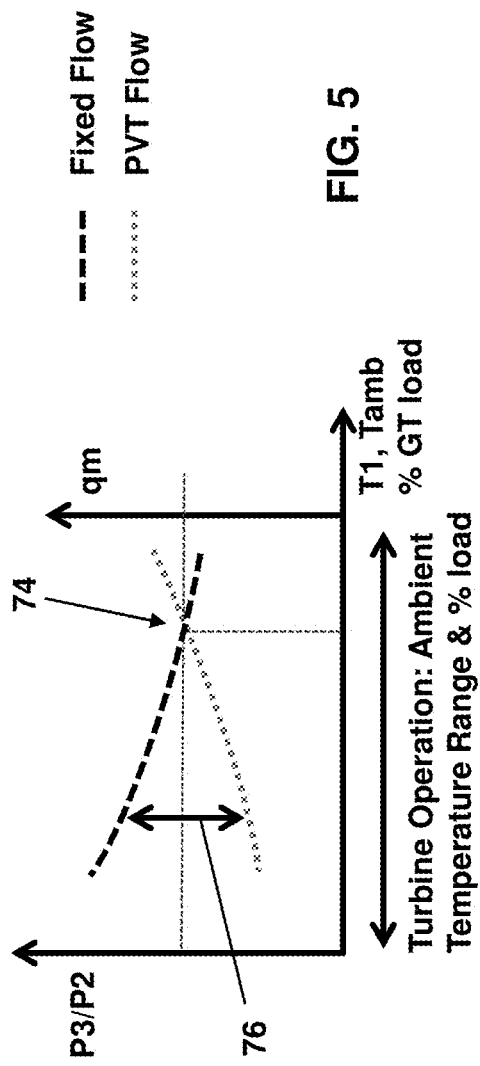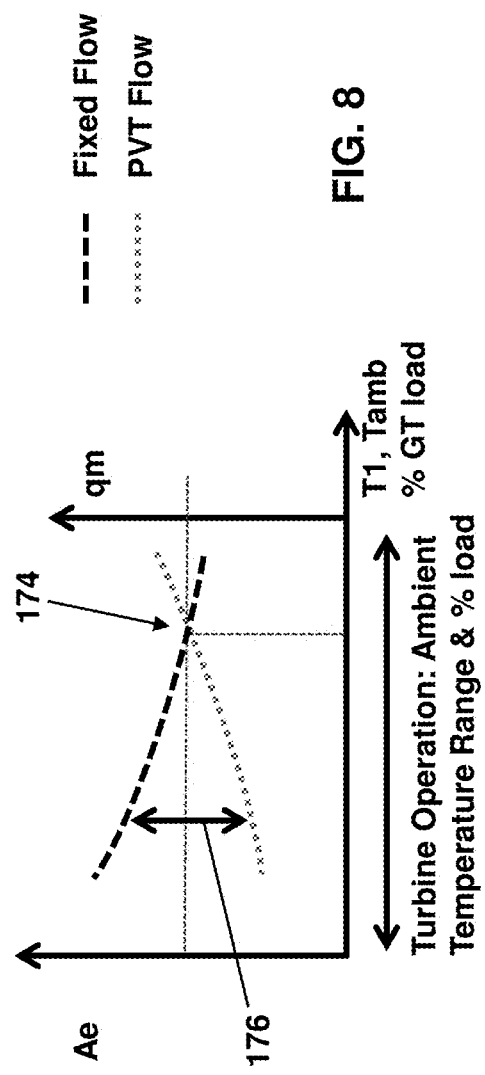

PASSIVE FLOW MODULATION OF COOLING FLOW INTO A CAVITY

FIELD

The disclosure relates generally to turbomachines, and more particularly, to passive flow modulation of cooling flow into a cavity.

BACKGROUND

Turbines are widely used in a variety of aviation, industrial, and power generation applications to perform work. Such turbines generally include alternating stages of peripherally mounted stator vanes and rotating blades. The stator vanes may be attached to a stationary component such as a casing that surrounds the turbine, and the rotating blades may be attached to a rotor located along an axial centerline of the turbine. A compressed working fluid, such as steam, combustion gases, or air, flows along a gas path through the turbine to produce work. The stator vanes accelerate and direct the compressed working fluid onto a subsequent stage of rotating blades to impart motion to the rotating blades, thus turning the rotor and performing work.

Various components (e.g., blades, nozzles, shrouds, etc.) and areas (e.g., wheelspaces between stator and rotor) of turbines are typically cooled in some fashion to remove heat transferred by the hot gas path. A gas such as compressed air from an upstream compressor may be supplied through at least one cooling circuit including one or more cooling passages to cool the turbine.

BRIEF DESCRIPTION

A first aspect of the disclosure provides a passive flow modulation device, including: a pressure sensitive main valve controlling a flow of a cooling fluid from a first area to a second area through an orifice; and a temperature sensitive pilot valve coupled to the pressure sensitive main valve, the temperature sensitive pilot valve configured to open at a predetermined temperature in the first area, causing a pressurization of the pressure sensitive main valve, wherein the pressurization of the pressure sensitive main valve actuates the pressure sensitive main valve to an open position, allowing the cooling fluid to flow from the first area to the second area through the orifice.

A second aspect of the disclosure provides a cooling system for a turbine, including: an orifice located between a first area and a second area of the turbine, a passive flow modulation device disposed adjacent the orifice for selectively directing a flow of a cooling fluid through the orifice from a first area of the turbine to a second area of the turbine, the passive flow modulation device including: a pressure sensitive main valve controlling a flow of a cooling fluid from a first area to a second area through an orifice; and a temperature sensitive pilot valve coupled to the pressure sensitive main valve, the temperature sensitive pilot valve configured to open at a predetermined temperature in the first area, causing a pressurization of the pressure sensitive main valve, wherein the pressurization of the pressure sensitive main valve actuates the pressure sensitive main valve to an open position, allowing the cooling fluid to flow from the first area to the second area through the orifice.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

FIG. 3 depicts a PFM device in a closed position according to embodiments.

FIG. 4 depicts the PFM device of FIG. 3 in an open position according to embodiments.

FIG. 5 depicts a graph of the flow modulation provided by the PFM device of FIGS. 3 and 4 according to embodiments.

FIG. 8 depicts a graph of the flow modulation provided by the PFM device of FIGS. 6 and 7 according to embodiments.

Figure 1:
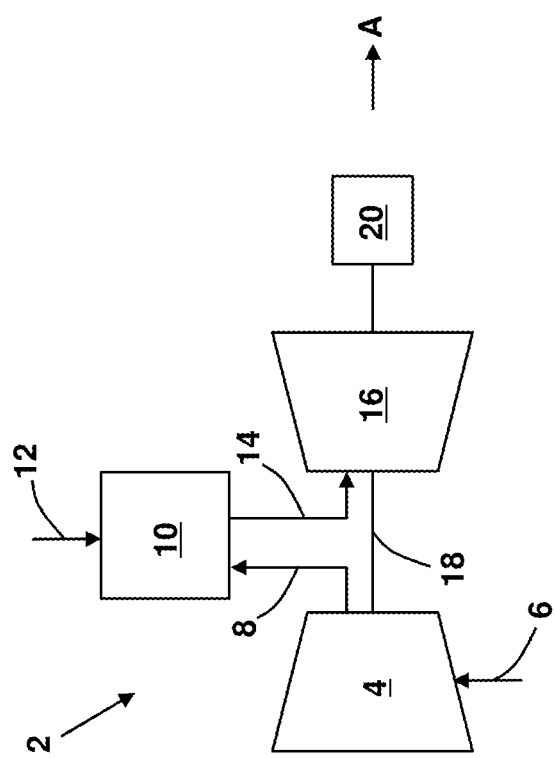
FIG. 1 is a schematic diagram of a gas turbine system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The disclosure relates generally to turbomachines, and more particularly, to passive flow modulation of cooling flow into a cavity.

In the Figures, for example in FIG. 1, the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

Referring now to the drawings, in which like numerals refer to like elements throughout the several views, FIG. 1 shows a schematic view of a gas turbine system 2 as may be used herein. The gas turbine system 2 may include a compressor 4. The compressor 4 compresses an incoming flow of air 6. The compressor 4 delivers a flow of compressed air 8 to a combustor 10. The combustor 10 mixes the flow of compressed air 8 with a pressurized flow of fuel 12 and ignites the mixture to create a flow of combustion gases 14. Although only a single combustor 10 is shown, the gas turbine system 2 may include any number of combustors 10. The flow of combustion gases 14 is in turn delivered to a turbine 16. The flow of combustion gases 14 drives the turbine 16 to produce mechanical work. The mechanical work produced in the turbine 16 drives the compressor 4 via a shaft 18, and may be used to drive an external load 20, such as an electrical generator and/or the like.

Figure 2:
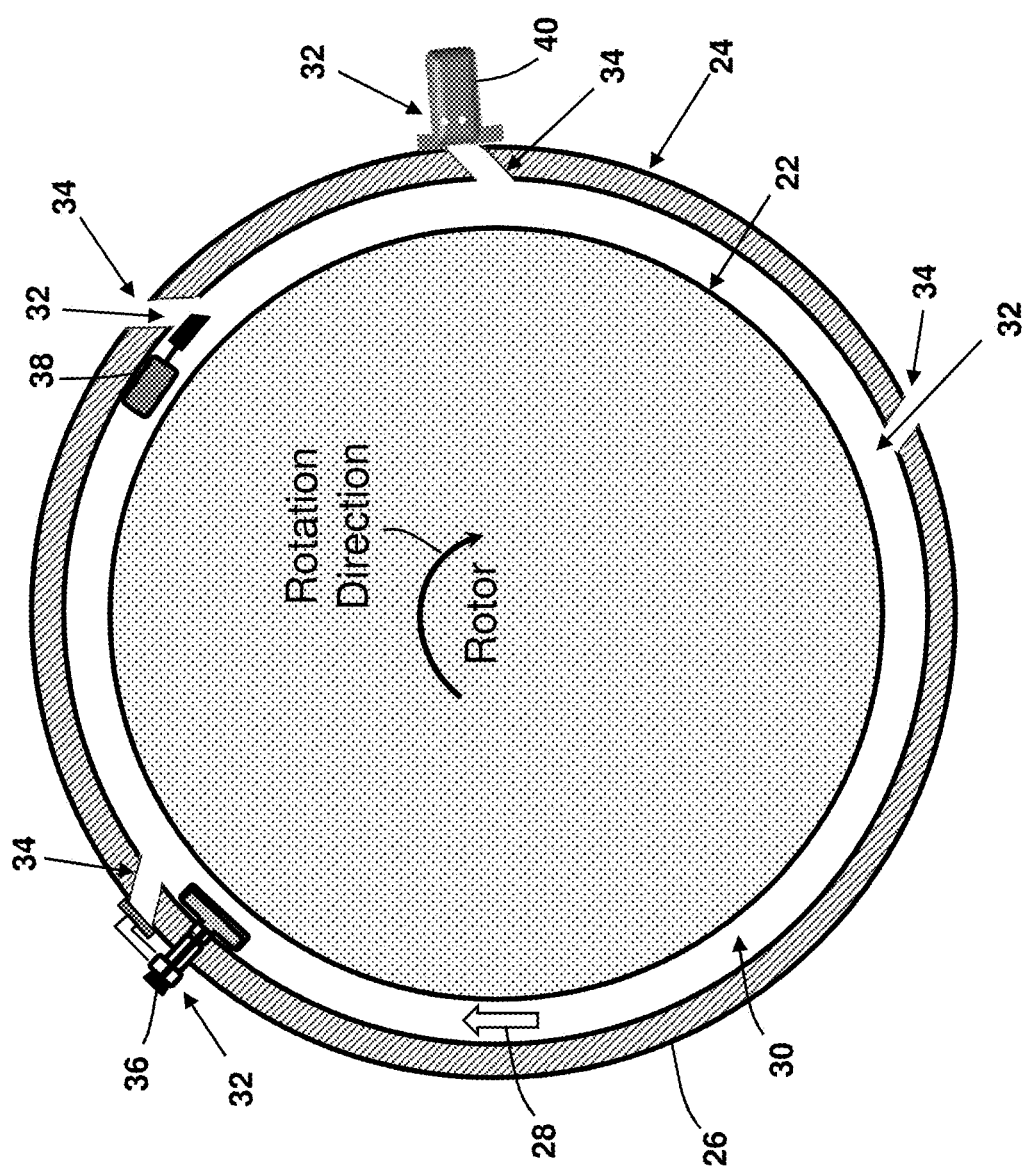
FIG. 2 is a cross-sectional view of a rotor, stator, and a plurality of passive flow modulation (PFM) devices according to embodiments.

A cross-sectional view of a turbine rotor 22 rotating within a stator 24 (e.g., along axis A) during operation of a gas turbine system 2 (FIG. 1) is depicted in FIG. 2. A rotating flow of air 28 is produced in a wheelspace cavity 30 within the stator 24 during rotation of the rotor 22. A plurality of orifices 34 are circumferentially positioned about the stator 24. Cooling air 32 is tangentially injected via the plurality of orifices 34 into the wheelspace cavity 30 in a direction of rotation of the rotor 22 from a "cold" area (e.g., outside of the stator 24 in this example) to a "hot" area (e.g., the wheelspace cavity 30). The cooling air 32 may be generated for example by a compressor 4 of a gas turbine system 2 (FIG. 1). The orifices 34 may be used, for example, as pre-swirl orifices and/or flow inducers in manner known in the art. According to embodiments, at least one of the plurality of orifices 34 is provided with a passive flow modulation (PFM) device 36, 38, or 40 for selectively controlling the amount of cooling air 32 that is allowed to pass through the orifice 34 into the wheelspace cavity 30.

According to embodiments, a PFM device 36, 38 may be used in series with an orifice 34 to variably control the flow of cooling air 32 passing through the orifice 34 into the wheelspace 30 (e.g., from a cold area to a hot area). For example, the PFM device 36, 38 may initiate the flow of cooling air through the orifice 34, and then increase and accelerate the flow of cooling air 32 exiting the orifice 34 into the wheelspace cavity 30 to or close to the speed of rotation of the rotor 22. Each orifice 34 includes a defined effective throat area Ae and exit angle α to provide a flow path such that the exit velocity and orientation of the air flow provides optimal heat transfer efficiency in the wheelspace cavity 30. The PFM device 36, 38 provides cooling flow savings across the operating range of the turbine 16 and improves the output and efficiency of the turbine 16.

According to other embodiments, a binary PFM device 40 may be used in series with an orifice 34 to binarily control the flow of cooling air 32 passing through the orifice 34 into the wheelspace cavity 30. In a closed position, cooling air 32 is prevented from flowing through the orifice 34 into the wheelspace cavity 30. In an open position, the binary PFM device 40 delivers a specific flow of cooling air to the wheelspace cavity 30. Turbine performance is improved, since the binary PFM device 40 is closed during most turbine operating modes except when high temperatures are predicted or measured in the wheelspace cavity 30.

One or more of the orifices 34 may provide a continuous (e.g., unmodulated) flow of cooling air 32 into the wheelspace cavity 30. Such an orifice 34 is depicted in the lower section of FIG. 2.

The PFM device 36 according to embodiments is depicted in FIGS. 3 and 4. The PFM device 36 is in a closed position in FIG. 3 and in an open position in FIG. 4. In embodiments, some of the components of the PFM device 36 are located in a cold area (e.g., outside of the stator 24), while other components are disposed within a hot area (e.g., the wheelspace cavity 30).

The PFM device 36 includes a valve system 42 positioned in a cold area 44. The valve system 42 includes at least one gas inlet port 46 (FIG. 4) and a gas outlet port 48. A conduit 50 fluidly couples the gas outlet port 48 of the valve system 42 to the orifice 34. An adapter/connector 52 couples the conduit 50 to the stator 24.

A temperature sensitive element 54 disposed within a hot area (e.g., the wheelspace cavity 30) may be used for actuating the PFM device 36. In embodiments, the temperature sensitive element 54 may include a housing 56 containing a thermally expandable material 58. The thermally expandable material 58 may include, for example, a silicon heat transfer fluid or any other suitable thermally expandable material that is stable at the operating temperatures of the turbine 16 (e.g., up to 1300° F.). In other embodiments, the temperature sensitive element 54 may include, for example, a bimetallic element or other type of arrangement that changes size and/or shape in response to a change in temperature.

The thermally expandable material 58 within the housing 56 engages a head 59 of a piston 60, which extends through the stator 24 to a cold area 44. In embodiments, the valve system 42 includes a valve disc 62 that is attached to a distal end of the piston 60. Opposing outer side surfaces 64 (FIG. 4) of the valve disc 62 are configured to mate with corresponding surfaces of a valve seat 66 of the valve system 42. In further embodiments, other valve mechanisms such as, for example, a spring-loaded pintle, a ball and stopper, a butterfly plate valve, and/or the like may be used.

The PFM device 36 is shown in a closed configuration in FIG. 3. That is, in the closed configuration, at least a portion of the outer side surfaces 64 (FIG. 4) of the valve disc 62 engage the valve seat 66 of the valve system 42. In the closed configuration, cooling air 32 is prevented from flowing from a colder area 44, outside of the stator 24, through the conduit 50 and the orifice 34 into a hotter area (e.g., the wheelspace cavity 30).

Referring now to FIG. 4, an increase in temperature in the wheelspace cavity 30 causes an enlargement of the thermally expandable material 58 within the housing 56. As a result, the thermally expandable material 58 expands and forces the head 59 of the piston 60 downward. The displacement of the piston 60 forces the valve disc 62 attached to the end of the piston 60 away from the valve seat 66 as indicated by arrow 70. When the outer side surfaces 64 of the valve disc 62 no longer contact the valve seat 66, a flow of cooling air 32 begins to flow from the gas inlet port 46 through the gas outlet port 48, conduit 50, and orifice 34, into the wheelspace cavity 30. The flow of cooling air 32 increases as the valve disc 62 moves farther away from the valve seat 66 (as the temperature increases further) as more flow area is provided between the outer side surfaces 64 of the valve disc 62 and the valve seat 66.

A graph of the flow modulation provided by the PFM device 36 is illustrated in FIG. 5. As shown, the ratio of the pressure (P3) in the orifice 34 and the pressure (P2) in the wheelspace cavity 30, as well as the air mass flow (qm) through the orifice 34, increases as the temperature (T1) and turbine load (GT load) increase. Arrow 74 indicates a target pressure ratio (P3/P2) and air mass flow (qm) for optimized cooling efficiency for an illustrative turbine (e.g., turbine 16). As indicated by arrow 76, the PFM device 36 provides a substantial cooling flow savings across much of the operating range of the turbine as compared to a fixed flow, which improves the output and efficiency of the turbine.

Figure 6:
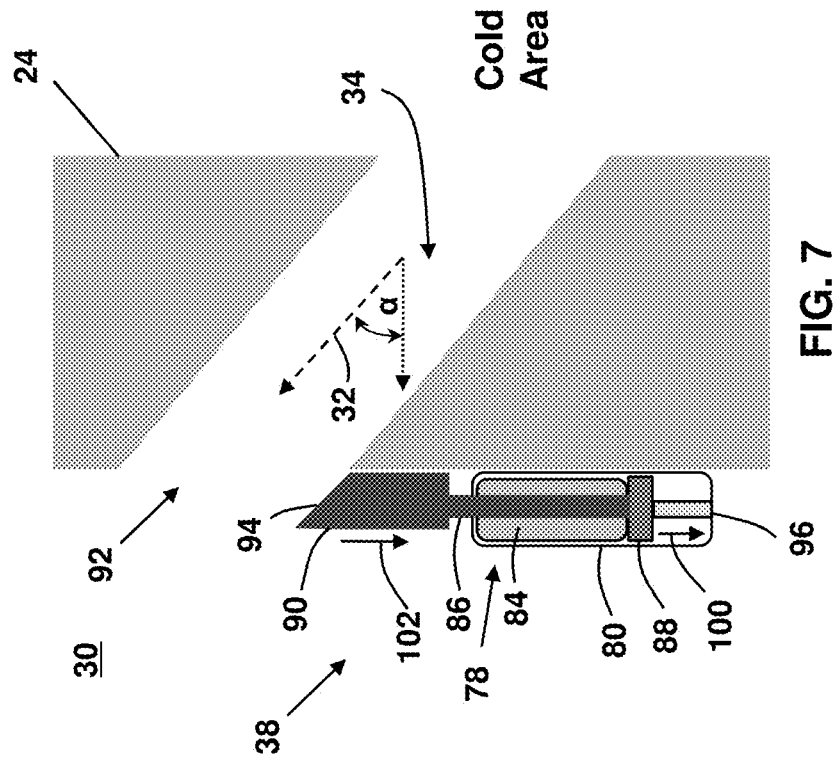
FIG. 6 depicts a PFM device in a reduced flow position according to embodiments.
Figure 7:
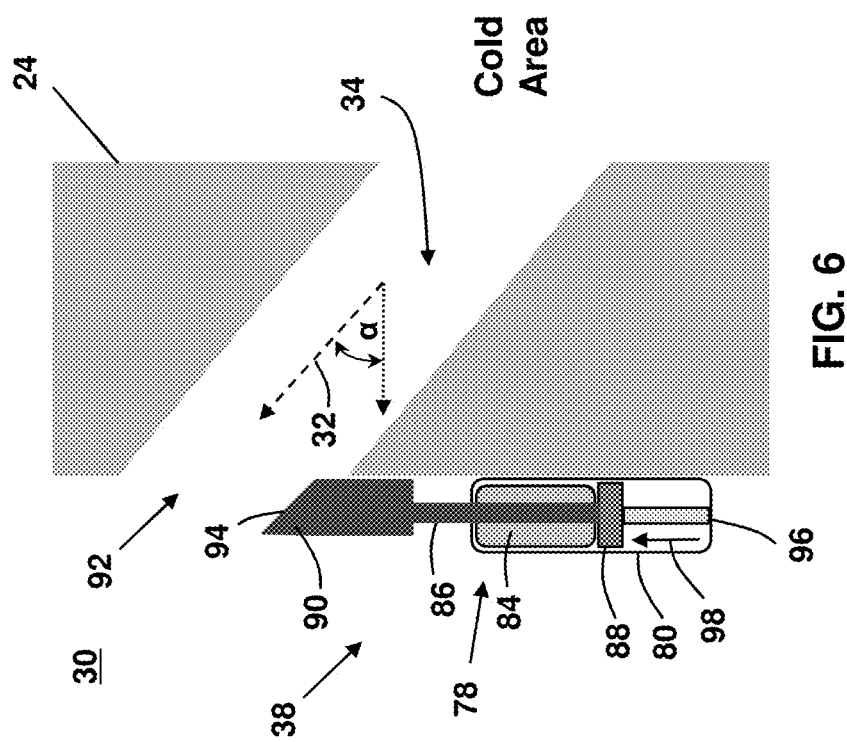
FIG. 7 depicts the PFM device of FIG. 6 in a full flow position according to embodiments.

The PFM device 38 according to embodiments is depicted in FIGS. 6 and 7. The PFM device 38 is in a reduced flow position in FIG. 6 and in a full flow position in FIG. 6. In embodiments, the PFM device 38 is disposed within the wheelspace cavity 30 (e.g., a hot area).

The PFM device 38 includes a temperature sensitive element 78 disposed within the wheelspace cavity 30. In embodiments, the temperature sensitive element 78 includes a housing 80 partially filled with a thermally expandable material 84. The thermally expandable material 84 may include, for example, a silicon heat transfer fluid or any other suitable thermally expandable material that is stable at the operating temperatures of the turbine 16. In other embodiments, the temperature sensitive element 78 may include, for example, a bimetallic element or other type of arrangement that changes size and/or shape in response to a change in temperature.

A piston 86 is coupled to a movable shelf 88. A head 90 of the piston 86 extends at least partially over an exit 92 of an orifice 34. The distal end surface 94 of the head 90 of the piston 86 may have an angled configuration corresponding to the flow angle α of cooling air 32 through the orifice 34 into the wheelspace cavity 30. The angled configuration of the distal end surface 94 of the head 90 of the piston 86 helps to direct the flow of, and maintain the exit angle of, cooling air 32 into the wheelspace cavity 30. Other configurations of the end surface 94 of the head 90 of the piston 86 (e.g., perpendicular to the displacement direction of the piston 86) may also be used.

A biasing member 96 (e.g., a spring) biases the movable shelf 88 and piston 86 towards the exit 92 of the orifice 34 as indicated by arrow 98. In the configuration depicted in FIG. 6, the head 90 of the piston 86 extends at least partially over the exit 92 of the orifice 34. This reduces the flow of cooling air 32 that can pass through the orifice 34 into the wheelspace cavity 30.

Referring now to FIG. 7, an increase in temperature in the wheelspace cavity 30 causes an expansion of the thermally expandable material 84 within the housing 80 and a corresponding displacement of the piston 86 in direction 100. The force applied by the piston 86 counteracts the biasing force applied by the biasing member 96 and forces the movable shelf 88 and piston 86 in direction 100. As indicated by arrow 102, the expansion of the thermally expandable material 84 displaces the head 90 of the piston 86 away from the exit 92 of the orifice 34. Since the head 90 of the piston 86 is now blocking less of the exit 92 of the orifice 34, a larger flow of cooling air 32 can pass from the cold area outside of the stator 24 through the orifice 34 into the wheelspace cavity 30. The flow of cooling air 32 continues to increase as the temperature within the wheelspace cavity 30 increases, which causes additional displacement of the head 90 of the piston 86 away from the exit 92 of the orifice 34. In FIG. 7, the exit 92 of the orifice 34 is fully open.

A graph of the flow modulation provided by a PFM device 38 is illustrated in FIG. 8. As shown, the effective flow area (Ae) and the air mass flow (qm) of the cooling air 32 through the orifice 34 increase as the temperature (T1) and turbine load (GT load) increase. Arrow 174 indicates a target effective flow area (Ae) and air mass flow (qm) for optimized cooling efficiency for an illustrative turbine (e.g., turbine 16). As indicated by arrow 176, the PFM device 38 provides a substantial cooling flow savings across much of the operating range of the turbine as compared to a fixed flow, which improves the output and efficiency of the turbine.

Figure 9:
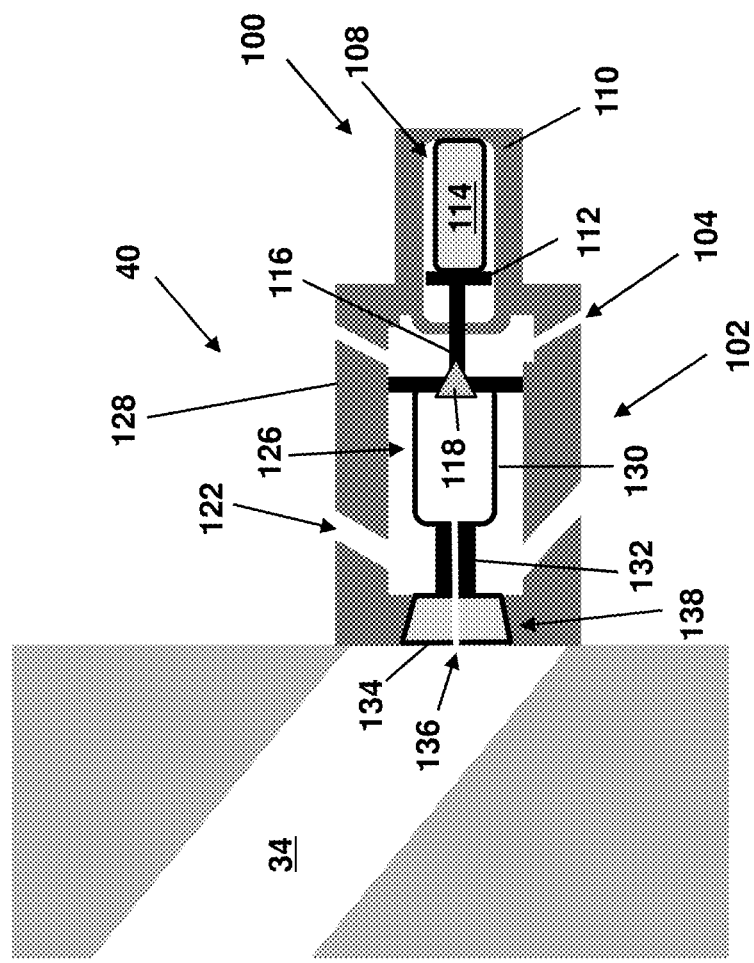
FIG. 9 depicts a binary PFM device in a non-flow position according to embodiments.
Figure 10:
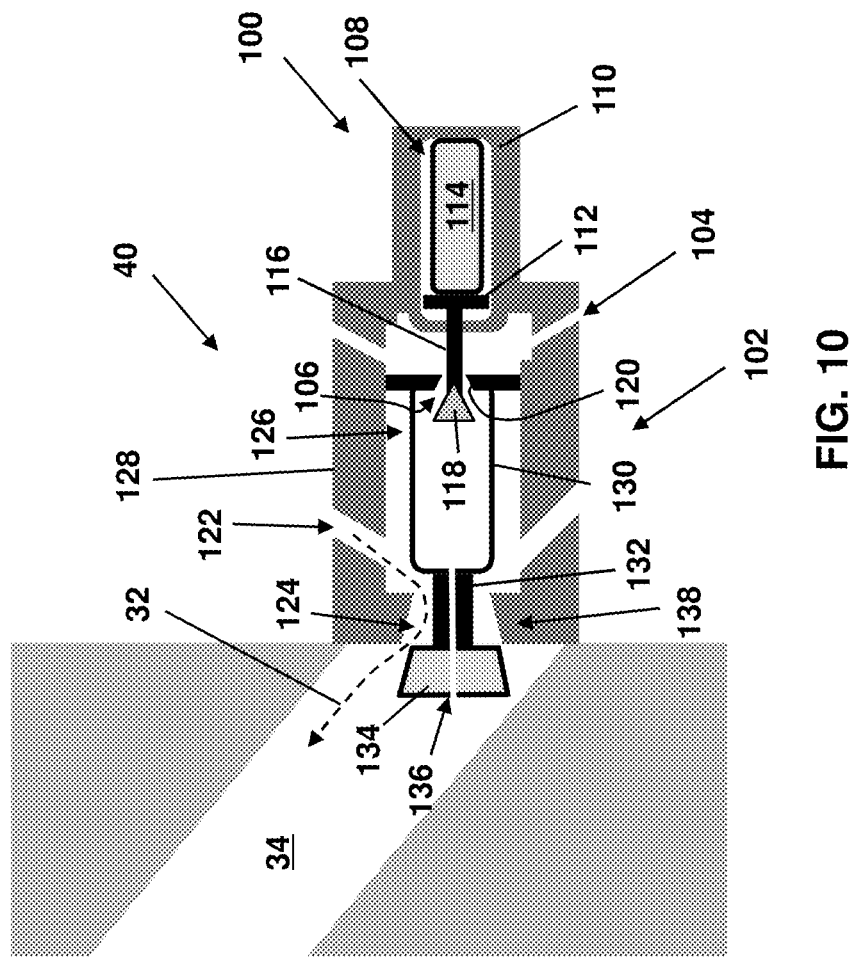
FIG. 10 depicts a binary PFM device in a full-flow position according to embodiments.

The binary PFM device 40 according to embodiments is depicted in FIGS. 9 and 10. The PFM device 40 is in non-flow position in FIG. 9 and in a full-flow position in FIG. 10. In embodiments, the PFM device 40 is disposed in a cold area (e.g., outside the stator 24).

As depicted in FIGS. 9 and 10, the binary PFM device 40 includes a temperature sensitive pilot valve 100 and a pressure sensitive main valve 102. The temperature sensitive pilot valve 100 is configured to open at a predetermined temperature, which causes a pressurization of the pressure sensitive main valve 102. The pressurization of the pressure sensitive main valve 102 actuates the pressure sensitive main valve 102 to a full open position. To this extent, the pressure sensitive main valve 102 is either full open or full closed.

The temperature sensitive pilot valve 100 includes at least one gas inlet port 104 and a gas outlet port 106 (FIG. 10). A temperature sensitive element 108 for actuating the temperature sensitive pilot valve 100 is located within a housing 110. In embodiments, the housing 110 is partially filled with a thermally expandable material 114. The thermally expandable material 114 may include, for example, a silicon heat transfer fluid or any other suitable thermally expandable material that is stable at the operating temperatures of the turbine 16). In other embodiments, the temperature sensitive element 114 may include, for example, a bimetallic element or other type of arrangement that changes size and/or shape in response to a change in temperature.

The thermally expandable material 114 engages a head 112 of a piston 116. A valve disc 118 is attached to a distal end of the piston 116. In the non-flow state, opposing outer side surfaces of the valve disc 118 mate with corresponding surfaces of a valve seat 120 (FIG. 10). In further embodiments, other valve mechanisms such as, for example, a spring-loaded pintle, a ball and stopper, a butterfly plate valve, and/or the like may be used.

The pressure sensitive main valve 102 includes at least one gas inlet port 122 and a gas outlet port 124 (FIG. 10). A pressure sensitive element 126 for actuating the pressure sensitive main valve 102 is located within a housing 128. In embodiments, the pressure sensitive element 126 may include a bellows 130 (or other expandable element (e.g., a diaphragm)) that is fluidly coupled to the gas outlet port 106 of the temperature sensitive pilot valve 100.

The bellows 130 is coupled to a piston 132. A valve disc 134 is attached to a distal end of the piston 132. A weep hole 136, which extends through the piston 132 and valve disc 134, fluidly couples the bellows 130 and the gas outlet port 124. The weep hole 136 releases pressure in the bellows 130 when the temperature sensitive pilot valve 100 closes. In the non-flow state, opposing outer side surfaces of the valve disc 134 mate with corresponding surfaces of a valve seat 138, preventing cooling air 32 from flowing from the gas inlet port(s) 122 through the gas outlet port 124 into the orifice 34 and wheelspace cavity 130. In further embodiments, other valve mechanisms such as, for example, a spring-loaded pintle, a ball and stopper, a butterfly plate valve, and/or the like may be used.

Referring now to FIG. 10, an increase in temperature in the cold area surrounding the binary PFM device 40 causes an expansion of the thermally expandable material 114 within the housing 110. The expansion of the thermally expandable material 114 within the housing 110 displaces the valve disc 118 attached to the end of the piston 116 away from the valve seat 120. When the outer side surfaces of the valve disc 118 no longer contact the valve seat 120, ambient air passes through the gas inlet port(s) 104 and the gas outlet port 106 into the bellows 130. This pressurizes the bellows 130.

The pressurization causes the bellows 130 to expand, displacing the attached piston 132 outward toward the gas outlet port 124. In response to the outward displacement of the piston 132, the valve disc 134 is displaced away from the valve seat 138, allowing cooling air 32 to pass from the gas inlet port(s) 122, through the gas outlet port 124 and the orifice 34, into the hot area (e.g., the wheelspace cavity 30).

Figure 11:
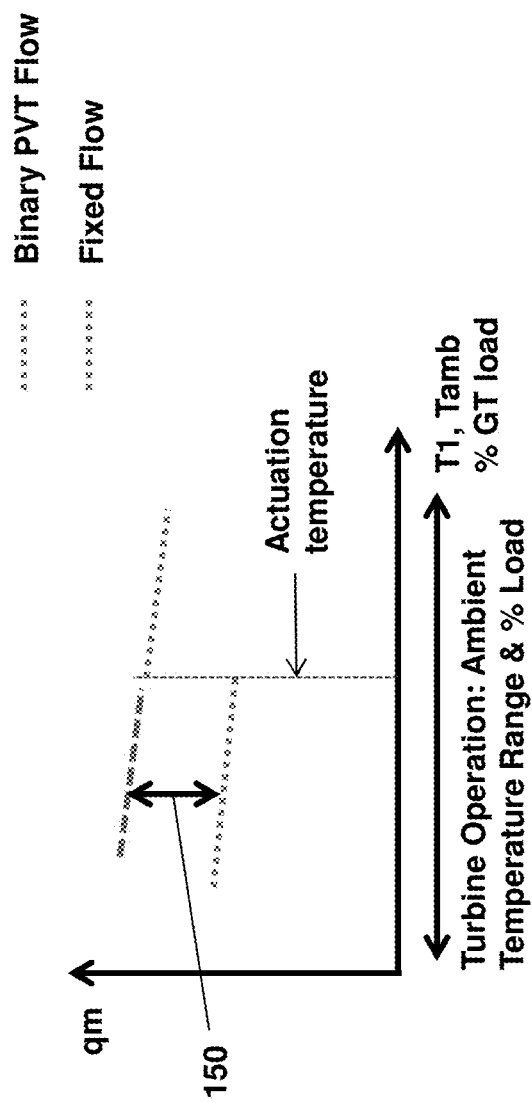
FIG. 11 depicts a graph of the flow modulation provided by the binary PFM device of FIGS. 9 and 10 according to embodiments.

A graph of the flow modulation provided by the binary PFM device 40 is illustrated in FIG. 11. As shown, the air mass flow (qm) through the orifice 34 at temperatures above the actuation temperature of the temperature sensitive pilot valve 100 is the same as a fixed flow orifice 34. At temperatures under the actuation temperature, as indicated by arrow 150, the binary PFM device 40 provides a substantial cooling flow savings across much of the operating range of the turbine, which improves the output and efficiency of the turbine.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A passive flow modulation device, comprising:
   a pressure sensitive main valve controlling a flow of a cooling fluid from a first area to a second area through an orifice; and
   a temperature sensitive pilot valve coupled to the pressure sensitive main valve, the temperature sensitive pilot valve configured to open at a predetermined temperature in the first area, causing a pressurization of the pressure sensitive main valve,
   wherein the pressurization of the pressure sensitive main valve actuates the pressure sensitive main valve to an open position, allowing the cooling fluid to flow from the first area to the second area through the orifice,
   wherein the pressure sensitive main valve further includes:
      a pressure sensitive element disposed within a housing, the housing including a valve seat and a gas outlet port;
      a main piston coupled to the pressure sensitive element; and
      a main valve disc coupled to the main piston for selectively engaging the valve seat in response to a change in pressurization of the pressure sensitive element,
   and
   wherein the temperature sensitive pilot valve further includes:
      a temperature sensitive element;
      a pilot piston coupled to the temperature sensitive element; and
      a pilot valve disc coupled to the pilot piston, the pilot valve disc selectively engaging an opening in the pressure sensitive element in response to a change in temperature of the temperature sensitive element.

2. The passive flow modulation device of claim 1, wherein the temperature sensitive element increases in size in response to an increase in temperature in the first area, the increase in size of the temperature sensitive element displacing the pilot valve disc away from the opening in the pressure sensitive element.

3. The passive flow modulation device of claim 2, wherein the cooling fluid flows from the first area into the pressure sensitive element through the opening to pressurize the pressure sensitive element.

4. The passive flow modulation device of claim 3, wherein the pressurization of the pressure sensitive element increases a size of the pressure sensitive element, the increase in size of the pressure sensitive element displacing the main valve disc away from the valve seat, allowing the cooling fluid to flow from the first area to the second area through the gas outlet port and the orifice.

5. The passive flow modulation device of claim 1, wherein the pressure sensitive main valve includes a weep hole for fluidly coupling the pressure sensitive element with the gas outlet port, the weep hole releasing pressure from the pressure sensitive element.

6. The passive flow modulation device according to claim 1, wherein the first area and the second area are located within a turbine.

7. The passive flow modulation device according to claim 6, wherein the second area is disposed between a stator and rotor of the turbine.

8. The passive flow modulation device according to claim 6, wherein the second area comprises a wheelspace cavity of the turbine.

9. The passive flow modulation device according to claim 6, wherein the orifice comprises an angled orifice, and wherein the angled orifice comprises a pre-swirl orifice or a flow inducer.

10. A cooling system for a turbine, comprising:
an orifice located between a first area and a second area of the turbine,
a passive flow modulation device disposed adjacent the orifice for selectively directing a flow of a cooling fluid through the orifice from the first area of the turbine to the second area of the turbine, the passive flow modulation device including:
   a pressure sensitive main valve controlling a flow of a cooling fluid from the first area to the a second area through an orifice; and
   a temperature sensitive pilot valve coupled to the pressure sensitive main valve, the temperature sensitive pilot valve configured to open at a predetermined temperature in the first area, causing a pressurization of the pressure sensitive main valve,
   wherein the pressurization of the pressure sensitive main valve actuates the pressure sensitive main valve to an open position, allowing the cooling fluid to flow from the first area to the second area through the orifice,
wherein the pressure sensitive main valve further includes:
   a pressure sensitive element disposed within a housing, the housing including a valve seat and a gas outlet port;
   a main piston coupled to the pressure sensitive element;
   a main valve disc coupled to the main piston for selectively engaging the valve seat in response to a change in pressurization of the pressure sensitive element, and
   a weep hole for fluidly coupling the pressure sensitive element with the gas outlet port, the weep hole releasing pressure from the pressure sensitive element.

11. The cooling system of claim 10, wherein the temperature sensitive pilot valve further includes:
   a temperature sensitive element;
   a pilot piston coupled to the temperature sensitive element; and
   a pilot valve disc coupled to the pilot piston, the pilot valve disc selectively engaging an opening in the pressure sensitive element in response to a change in temperature of the temperature sensitive element.

12. The cooling system of claim 11, wherein the temperature sensitive element increases in size in response to an increase in temperature in the first area, the increase in size of the temperature sensitive element displacing the pilot valve disc away from the opening in the pressure sensitive element.

13. The cooling system of claim 12, wherein the cooling fluid flows from the first area into the pressure sensitive element through the opening to pressurize the pressure sensitive element.

14. The cooling system of claim 13, wherein the pressurization of the pressure sensitive element increases a size of the pressure sensitive element, the increase in size of the pressure sensitive element displacing the main valve disc away from the valve seat, allowing the cooling fluid to flow from the first area to the second area through the gas outlet port and the orifice.

15. The cooling system according to claim 10, wherein the second area comprises a wheelspace cavity of the turbine.

16. The cooling system according to claim 10, wherein the orifice comprises an angled orifice, and wherein the angled orifice comprises a pre-swirl orifice or a flow inducer.

* * * * *